Feb. 1, 1944. W. G. SMITH 2,340,572
CLAMP AND SUPPORTING BAR FOR DRILLS
Filed Sept. 16, 1942 2 Sheets-Sheet 1
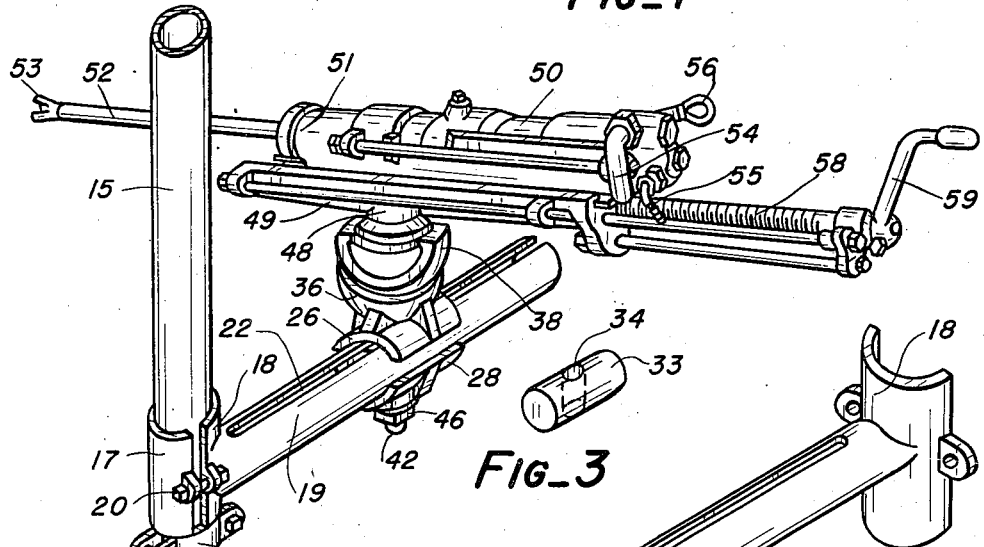
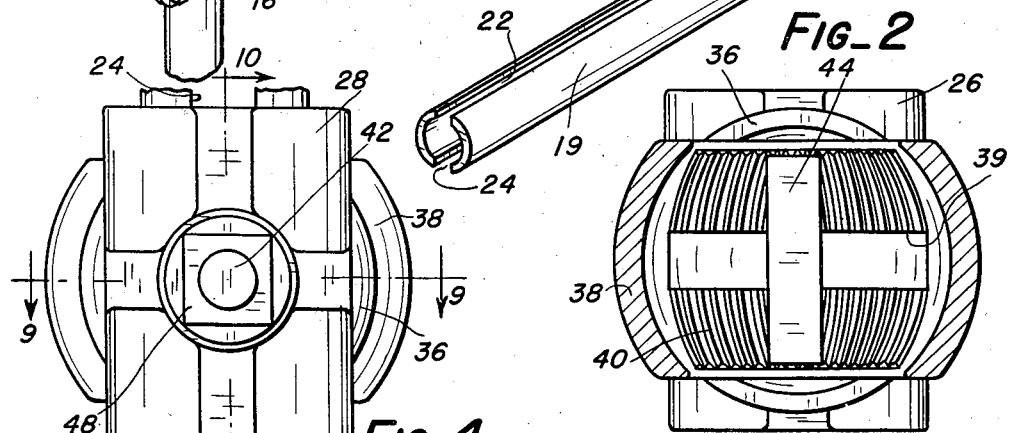
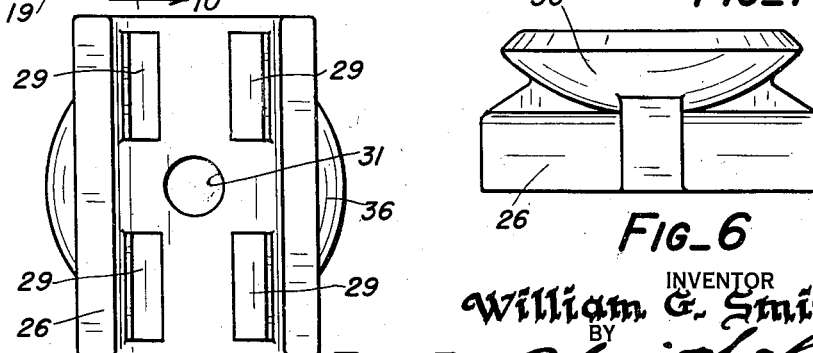
INVENTOR
William G. Smith
BY
ATTORNEYS

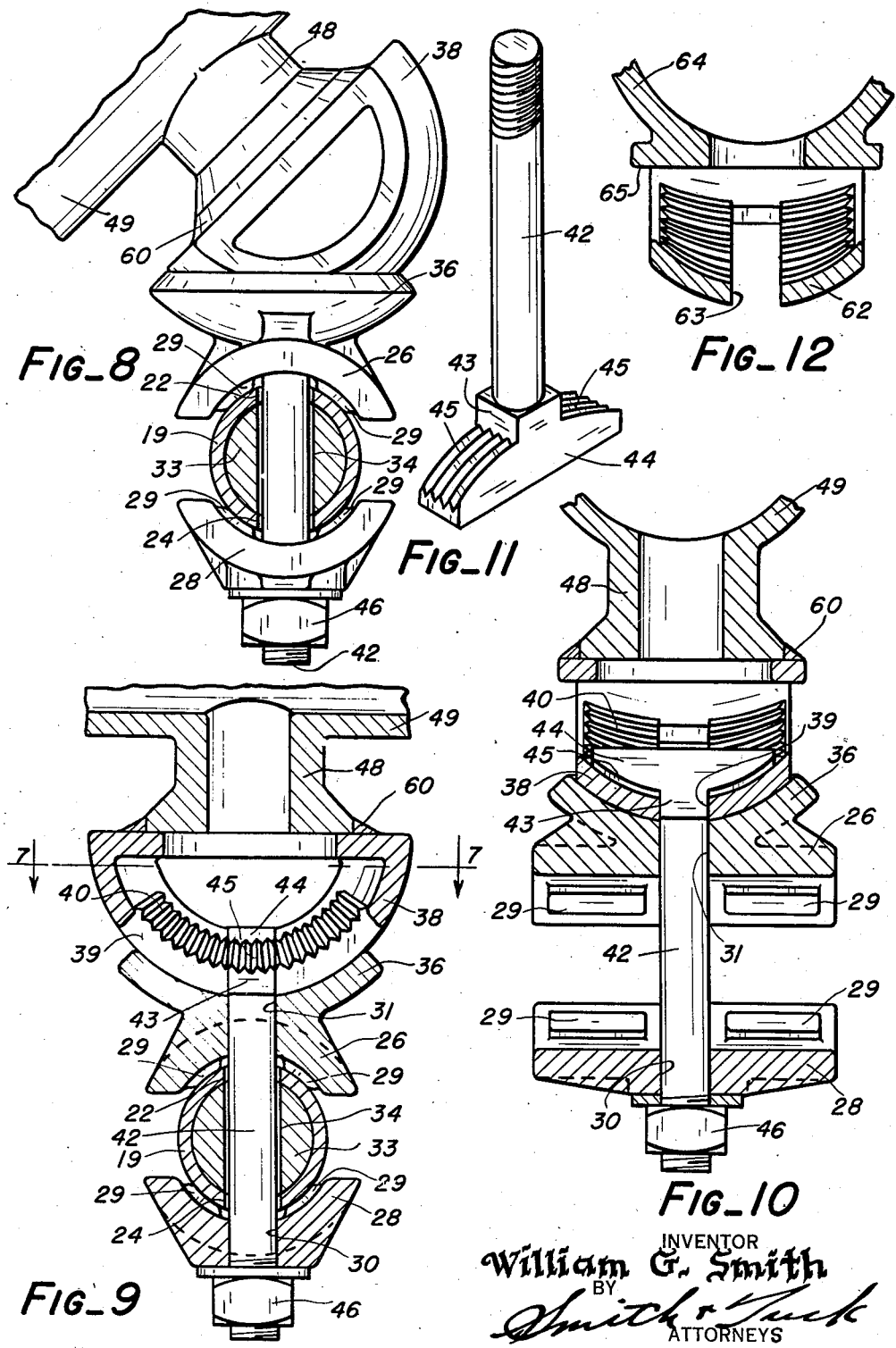

Patented Feb. 1, 1944

2,340,572

UNITED STATES PATENT OFFICE 2,340,572

CLAMP AND SUPPORTING BAR FOR DRILLS

William G. Smith, Seattle, Wash., assignor of fifty per cent to W. L. Grill, Seattle, Wash.

Application September 16, 1942, Serial No. 458,530

3 Claims. (Cl. 255—51)

This invention relates to improvements in a clamp and supporting bar for drills for use in mounting drilling machinery, winches, and the like for operative positioning as is more particularly required in tunneling, mining, and other related operations.

In the accompanying drawings I have illustrated my invention as being used to mount and support a percussion type drilling machine laterally from a vertically disposed tool column. For the purposes of this description I shall refer to the machine with which my device is employed as a drill or a drilling machine. It is to be understood, however, that I do not wish to be limited by this showing or by this specific description as these references are made purely for explanatory purposes and that it is contemplated that there are many other uses to which my invention may be applied without departing from the scope and import of the sub-joined claims.

Certain features of the device shown and described herein pertain to the subject matter of my U. S. Letters Patent No. 2,301,230, issued November 10, 1942.

As indicated in the above identified patent and as will be more fully described herein, I have found that drilling operations may be greatly facilitated by the use of a ball and socket type clamp for mounting the machine upon a supporting bar or arm. In using such a ball and socket arrangement it is my practice to clamp the parts rigidly together in an adjusted position by means of a clamp bolt which passes through the two parts and, by its use, the two parts may be brought together in a rigid frictional contact. In the co-pending application supplementary offset clamping means are employed for fastening the ball and socket arrangement to a supporting column or arm. In this application an alternative form of supporting arm is employed and a novel means is provided for joining the ball and socket device to the arm. By such an arrangement it now becomes possible for an operator of a drilling machine, in order to adjust his drill with relation to the clamp and to adjust the clamp with relation to its supporting means, to loosen a single nut and bolt whereby the ball and socket members can be rocked with relation to each other and whereby, at the same time, the clamp in toto can be moved longitudinally of its supporting member. From the practical standpoint of use, such an arrangement affords important advantages. As an example, the operator of a drilling machine can set up his equipment for drilling a hole at a predetermined point, operate the drill to produce the hole and then, by manipulating a single bolt means, he can either rock or swivel one part of his clamp with relation to the other to dispose the drill angularly to the original setting and at the same time he can shift the drill longitudinally to produce a new aligned drilling position.

An important object of my invention has been the provision of an improved clamp and supporting arm for machinery which mechanism is simple to manufacture and adapted for extremely hard usage in drilling operations.

Another object of my invention has been the provision of a clamp and arm that is rugged and composed of a minimum of parts and adapted to be used by unskilled labor without fear of injury.

A further object of the invention has been the provision, in a clamp supporting arm, of means for receiving a clamp member for positive positioning vertically while at the same time the member may be readily adjusted longitudinally of said arm.

Still another object of the invention resides in the provision of a drill supporting arm that is longitudinally slotted for cooperative use with a drill clamp which is associated therewith by means of a single clamp bolt.

Other objects and advantages of the invention will be apparent during the course of the following description wherein I have illustrated a preferred form of my invention.

In the drawings—

Figure 1 is a perspective view of a fragment of a drill column having a lateral arm mounted thereon and showing a conventional percussion drill machine clamped to the lateral arm by means of a knuckle ball and socket clamp, Figure 2 is a perspective view of a slotted arm illustrating one form which my invention can assume, Figure 3 is a perspective view of a filler member employed in connection with my supporting arm, Figure 4 is a view showing the outer face of a lower clamp saddle which I employ in joining my clamp to the supporting arm, Figure 5 is a view looking at the inner face of an upper clamp saddle employed for mounting the socket member of my clamp, Figure 6 is a side elevational view of the device of Figure 5, Figure 7 is a sectional view taken on line 7—7 of Figure 9 and showing in plan the interior of the knuckle and the means by which the knuckle is fastened to the supporting arm, Figure 8 is an enlarged detailed elevational view of the knuckle and socket of my clamp and of the clamp saddle showing in section the supporting arm, Figure 9 is a vertical medial sectional view taken on lines 9—9 of Figure 4, Figure 10 is a vertical medial sectional view taken on lines 10—10 of Figure 4 and at substantially right angles to the showing of Figure 9, Figure 11 is a perspective view of the T-headed bolt which I employ with my clamp, and Figure 12 illustrates a modified form of joining the knuckle to a guide shell of the drilling machine.

The numeral 15 designates a drill column, in this instance, shown to be formed of a piece of heavy tubing or pipe. In mining operations these drill columns are employed in many ways. A common mode is to mount such column in an upright manner between the floor and ceiling of a tunnel, but also they may be mounted horizontally between the side walls of a tunnel. A clamp 16 is engaged around the column for supporting the clamp halves 17 and 18 of the supporting arm 19. The members 17 and 18 are rigidly clamped about the column 15 by means of bolts 20 and these bolts may be loosened so that the arm 19 may be swung radially about the longitudinal axis of the column, and by means of the clamp 16, simultaneously, be prevented from sliding downwardly under urgence of its own weight and the added weight of a drill.

The arm 19 is provided with the upper longitudinal slot 22 and the lower slot 24. These slots extend throughout the length of the arm and are preferably diametrically disposed in the arm 19.

Upper and lower saddle segments 26 and 28, respectively, are fitted over the arm and lie on each side of the slots 22 and 24. The clamp members 26 and 28 are provided with inner friction bosses 29 which may be machined to accurately fit the curved outer face of the supporting arm to which these saddles may be fitted. The lower saddle 28 is provided with a bolt hole 30 and the upper saddle has a similar bolt hole 31 each of which may be brought in alignment with the slots 24 and 22, respectively.

The filler member 33 shown in Figure 3 is adapted to fit in the interior of the arm 19 and to be moved longitudinally. A bolt hole 34 is formed therein and it may be also aligned with the slots 22 and 24 and the holes 30 and 31 in the upper and lower saddles. The upper saddle has the socket mount 36 which is an arcuate segment that is adapted to receive the knuckle member 38. The knuckle 38 has a hollow interior and its curved outer wall is slotted at 39 to permit the insertion therethrough of a bolt shank.

In some forms of my invention the inner face of the curved wall of the knuckle may be substantially smooth but for the purposes of this description I have illustrated it as being corrugated, as at 40, to permit improved and positive frictional engagement of the head of a clamp bolt with this face. A clamp bolt employed in connection with my knuckle and socket clamp is shown in Figure 11, wherein the threaded bolt shank 42 is provided with a squared portion 43 and a T-head 44. The under faces of the arms of the T-head 44 is grooved as at 45 for cooperative operation with respect to the inner face of the knuckle 38. When the knuckle 38 is provided with corrugations it is preferable that these corrugations correspond to those provided on the T-head of the bolt. The thickness of the T-head is slightly less than the width of the slot 39 so that the T-head may be inserted through the slot by aligning its longest dimension with the axis of the slot 39. By turning it at approximate right angles to the slot, the arms of the T-head will rest upon the metal adjoining the slot and the squared shank 43 will be disposed in the slot as can best be seen in Figures 9 and 10. The shank 43 being positioned in the slot prevents the bolt-head from turning when the nut 46 is tightened on its threaded end.

In Figures 1, 8, 9, and 10 I have shown the knuckle 38 as being joined to the clamp cone 48 of the guide shell 49 which supports the longitudinally movable drill cylinder 50. The drill cylinder has a chuck 51 for receiving the drill shank 52 supporting the drill bit 53 on its outer end. On the rear end of the cylinder an air feed connection 54 may be provided to be joined to an air hose not shown. A water connection is usually effected by means of the swivel coupling 55 and the numeral 56 designates a throttle by which air is valved into the cylinder 50 for the operation of the mechanism contained therein to reciprocably and percussively move the drill bit. The cylinder 50 is advanced and retracted along the guide shell by means of the feed screw 58 which may be manually rotated through the instrumentality of the crank shaft 59. The knuckle 38 is joined to the clamp cone 48 by means of the bead of welding 60 shown in Figures 9 and 10.

An alternative form of the invention is illustrated in Figure 12 wherein the hollow knuckle 62, having a slot 63, is joined to a guide shell 64 of a drill directly to its lower flat face 65 rather than through the instrumentality of the clamp cone otherwise illustrated and described throughout this specification, and the drawings.

To move the clamp longitudinally of the arm 19 the nut 46 is loosened on the bolt 42 and the saddle segments 26 and 28 and the filler block 33 may be slid longitudinally with the bolt 42 moving along the slots 22 and 24. At the same time the drilling machine and the knuckle segments attached thereto can be rotated radially about the axis defined by the bolt.

In the cases where a relatively smooth inner face is employed on the bowl or knuckle 40 or 62, this knuckle or bowl may be also rocked with relation to its cooperating socket and the head of the bolt will slide on the inner face of the knuckle.

In those cases where corrugations 40 and 45 are employed on the bowl and on the arm of the T-bolt it will be understood that the bolt will be loosened to a somewhat greater extent so that these corrugations may be separated sufficiently to permit relative movement of the parts having the corrugations.

The foregoing description and the accompanying drawings are believed to clearly disclose a preferred embodiment of my invention but it will be understood that this disclosure is merely illustrative and that such changes in the invention may be made as are fairly within the scope and spirit of the following claims:

I claim:

1. Supporting and clamping mechanism for drills and the like comprising an arm having diametrically opposed slots, a clamp for joining said arm to a supporting means, a swivel clamp for mounting a machine on said bar, said swivel clamp comprising a knuckle ball member, a socket member cooperable therewith, one of said members adapted to be secured to the machine to be clamped, the other of said members having an axially positioned saddle for engagement over said arm, a clamp bolt having a shank passing through said knuckle ball member and said socket member and also through the saddle and the slots in said arm, and means engageable on said bolt for tightening together the members through which said bolt shank passes.

2. Supporting and clamping mechanism for drills and the like comprising an arm having diametrically opposed longitudinally extending slots, clamp means for joining said arm to a supporting member, a knuckle and socket swivel clamp adapted to be positioned between said machine and said arm and having a clamp bolt, the shank of said bolt extending through the slots in said arm, a nut on said bolt for tightening together the members through which said bolt is passed.

3. Supporting and clamping mechanism for drills and the like comprising a tubular arm having diametrically opposed longitudinally extending slots, a filler block adapted to be slid lengthwise in said arm, clamp saddles engageable on opposite sides of said arm, a knuckle and socket swivel clamp associated with one of said saddles and having a clamp bolt for tightening the knuckle and socket members together, said clamp bolt extending outwardly through the saddle with which the swivel clamp is associated and adapted to be passed through said slot and the filler block and the other saddle, and means engageable on said bolt for tightening the swivel clamp members together and the clamp saddles to said slotted arm.

WILLIAM G. SMITH.